(12) United States Patent
Deur

(10) Patent No.: US 7,398,874 B2
(45) Date of Patent: Jul. 15, 2008

(54) BELT-DRIVEN ACCUMULATOR FOR CURVED ROLLER SEGMENT

(75) Inventor: Delwyn G Deur, Grand Rapids, MI (US)

(73) Assignee: TGW-Ermanco, Inc., Spring Lake, MI (US)

(*) Notice: Subject to any disclaimer, the term of this patent is extended or adjusted under 35 U.S.C. 154(b) by 165 days.

(21) Appl. No.: 11/312,927

(22) Filed: Dec. 20, 2005

(65) Prior Publication Data

US 2006/0151298 A1 Jul. 13, 2006

Related U.S. Application Data

(60) Provisional application No. 60/641,977, filed on Jan. 7, 2005.

(51) Int. Cl.
*B65G 13/02* (2006.01)
*B65G 13/06* (2006.01)

(52) U.S. Cl. ............. 198/780; 198/781.01; 198/781.02; 198/781.03

(58) Field of Classification Search ............ 198/781.03, 198/781.02, 781.01, 780
See application file for complete search history.

(56) References Cited

U.S. PATENT DOCUMENTS

| | | | |
|---|---|---|---|
| 2,729,324 A | 1/1956 | Howdle | |
| 2,758,731 A | 8/1956 | Davis | |
| 3,085,696 A | 4/1963 | Stainforth et al. | |
| 3,465,870 A | 9/1969 | Paulsen | |
| 3,519,266 A * | 7/1970 | Blake et al. ................. | 271/251 |
| 4,096,942 A | 6/1978 | Shepherd | |
| 4,143,755 A | 3/1979 | Keller | |
| 4,444,209 A | 4/1984 | Seragnoli | |
| 4,485,913 A | 12/1984 | Treiber | |
| 5,007,526 A | 4/1991 | Fazzina et al. | |
| 5,038,923 A | 8/1991 | Evans | |
| 5,042,862 A * | 8/1991 | Tubke ........................ | 294/86.4 |
| 5,348,139 A | 9/1994 | Szarkowski et al. | |
| 5,558,205 A | 9/1996 | Helgerson et al. | |
| 5,687,831 A * | 11/1997 | Carlisle ...................... | 198/395 |
| 5,826,702 A | 10/1998 | Gibson et al. | |
| 5,899,659 A | 5/1999 | Beilsmith | |
| D411,680 S | 6/1999 | Black et al. | |
| 5,988,362 A | 11/1999 | Nakamura et al. | |
| 6,062,379 A | 5/2000 | Geib et al. | |
| D426,841 S | 6/2000 | Geib et al. | |
| 6,162,157 A * | 12/2000 | Morisod ..................... | 493/180 |
| 6,390,286 B1 | 5/2002 | Nguyen et al. | |
| 6,565,689 B2 | 5/2003 | Geib et al. | |

(Continued)

*Primary Examiner*—Gene O. Crawford
*Assistant Examiner*—Leslie Nicholson, III
(74) *Attorney, Agent, or Firm*—Cook, Alex, McFarron, Manzo, Cummings & Mehler, Ltd.

(57) ABSTRACT

An assembly is provided for moving the drive belt of a roller conveyor system between a first position in which the drive belt engages the rollers to rotate the rollers and a second position spaced from the rollers, the second position permitting conveyed articles to be accumulated on the rollers. The assembly comprises a bracket and at least one pulley having a circumferential groove for seating the drive belt. The pulley is rotatably secured to both the bracket and a first side frame for the conveyor. A guide roller is also secured to the bracket so as to maintain the drive belt seated on the pulley. At least one actuator is provided for our operating on the bracket to move the drive belt between the first and second positions.

8 Claims, 2 Drawing Sheets

U.S. PATENT DOCUMENTS

| | | |
|---|---|---|
| 6,612,423 B1 | 9/2003 | Silverman |
| 6,889,615 B2 * | 5/2005 | Johnson et al. ............. 104/162 |
| 2002/0134649 A1 | 9/2002 | Nguyen et al. |
| 2002/0153226 A1 | 10/2002 | Freudelsperger |
| 2003/0094350 A1 | 5/2003 | Kilper et al. |
| 2003/0188957 A1 | 10/2003 | Kilper et al. |

* cited by examiner

US 7,398,874 B2

BELT-DRIVEN ACCUMULATOR FOR CURVED ROLLER SEGMENT

CROSS REFERENCE TO RELATED APPLICATION

This application claims the benefit of the filing date of U.S. Provisional Application Ser. No. 60/641,977, filed Jan. 7, 2005.

BACKGROUND OF THE INVENTION

The invention relates to a belt-driven roller conveyor system in which accumulation or collection of the conveyed items is accomplished on a curved segment of the conveyor system.

As is known in the art, accumulation on a straight section with a belt-driven roller conveyor is commonly accomplished by lowering the mechanism that causes the drive belt to engage the underside of the rollers, thus allowing gravity to move the drive belt out of engagement with the driven rollers of a conveyor. However, this does not work when trying to accumulate on a curved section of a belt driven roller conveyor, as the twisting of the belt as it travels along a curve maintains it in contact with the rollers. Accordingly, it is an object of the present invention to provide a belt-driven roller conveyor that allows for accumulation on a curved segment thereof.

SUMMARY OF THE INVENTION

This object, as well as others which will become apparent upon reference to the following detailed description and accompanying drawings, is achieved by a belt-driven curved roller conveyor in which a drive belt is selectively engageable with the rollers for imparting rotation thereto. An assembly is provided for moving the drive belt of the conveyor system between a first position in which the drive belt engages the rollers to rotate the rollers and a second position spaced from the rollers, the second position permitting conveyed articles to be accumulated on the rollers. The assembly comprises a bracket and at least one pulley having a circumferential groove for seating the drive belt. The pulley is rotatably secured to both the bracket and a first side frame for the conveyor. A guide roller is also secured to the bracket so as to maintain the drive belt seated on the pulley. At least one actuator is provided for operating on the bracket to move the drive belt between the first and second positions.

In one aspect of the invention, the assembly comprises a first actuator for moving the bracket in a first direction for moving the drive belt to the first position and a second actuator for moving the bracket in a second direction to move the drive belt to the second position.

In another aspect of the invention the assembly includes an axle for the pulley, with the axle being secured to the first side frame and the bracket.

DESCRIPTION OF THE PREFERRED EMBODIMENT

Figure 1:
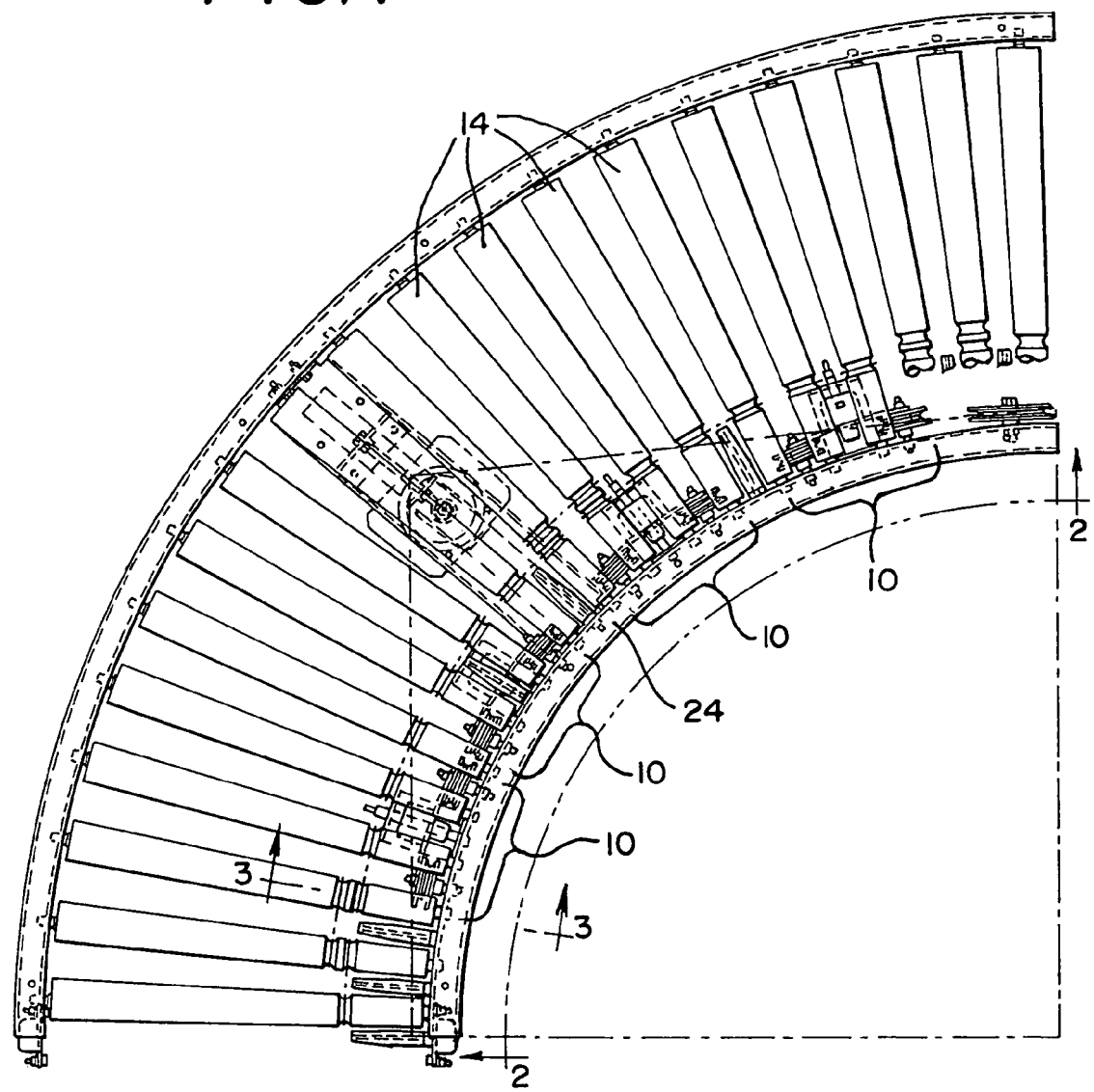
FIG. 1 is a top view of a curved roller segment of a belt-driven roller conveyor according to the present invention.
Figure 2:
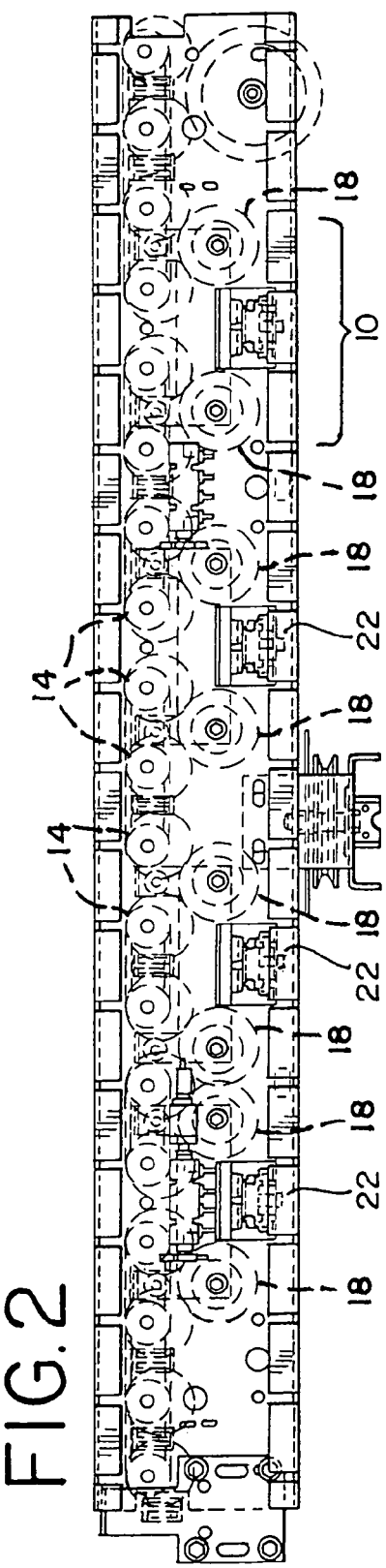
FIG. 2 is a side view of the curved roller segment of FIG. 1 as seen from line 2-2 in FIG. 1.
Figure 5:
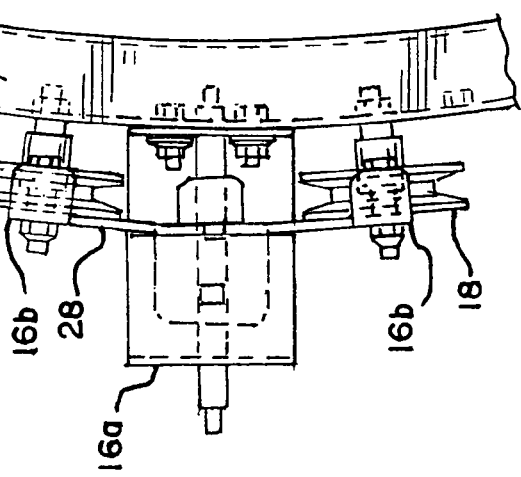
FIG. 5 is a top view of the mechanism of FIG. 3 as seen from line 5-5 in FIG. 3.
Figure 4:
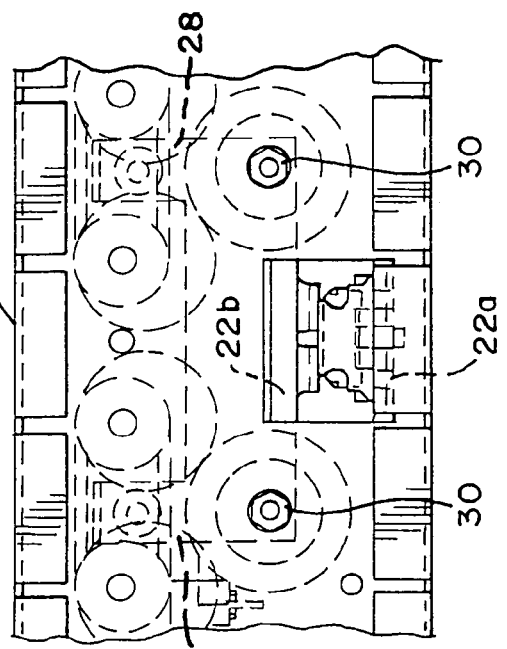
FIG. 4 is an enlarged fragmentary side view of the mechanism of FIG. 3 as seen from line 4-4 in FIG. 3.

Turning to the accompanying drawings, a mechanism, generally indicated 10, is provided for attaching to the curved side frame of the conveyor, the mechanism 10 capturing the drive belt 12 and moving the drive belt both into and out of engagement with the rollers 14 on the curved section. The mechanism 10 comprises a bracket assembly comprising two parts 16a, 16b that supports one or more freely-rotating sheaves or pulleys 18 (two shown) for supporting the top or drive run of the drive belt 12. Each pulley 18 has an associated guide roller 20. The belt 12 is thus captured between pulleys 18 and their associated guide rollers 20, so that as the bracket 16 to which the pulleys 18 are mounted is moved downwardly by a two-way linear actuator, generally designated 22, the belt 12 is moved out of engagement with the rollers 14 to permit accumulation. A plurality of such mechanisms 10 (four are shown in FIGS. 1 and 2) are spaced along the curved side frame 24.

The preferred drive belt 12 used in the system comprises a series of interlocking links, such as is disclosed in various U.S. Patents issuing to Fenner, Inc., of Manheim, Pa., including U.S. Pat. Nos. 6,565,689, 6,062,379 and Des. 426,841. However, other well-known drive belts, such as V-belts, round belts, hex belts, etc., could also be used without departing from the invention.

Figure 3:
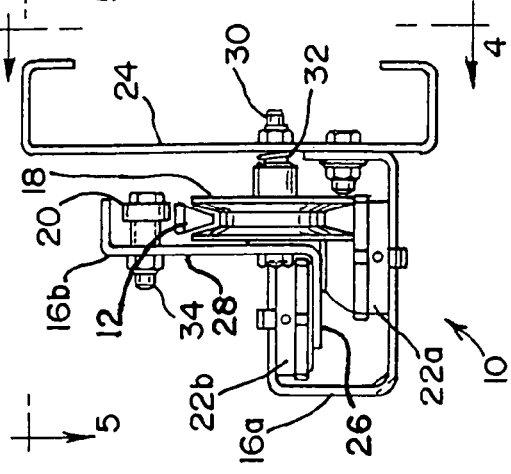
FIG. 3 is an end view of a mechanism for moving the drive belt into and out of engagement with the rollers in accordance with the present invention as seen from line 3-3 in FIG. 1.

As best seen in FIG. 3, the belt-moving mechanism 10 comprises a two-part bracket assembly. The first part 16a is secured to the side frame by a pair of bolts and supports two linear actuators 22a, 22b in an opposed relationship. The second part 16b of the bracket assembly has a leg 26 that is captured between the drive ends of the two linear actuators 22a, 22b, so as to be moveable vertically to effect selective engagement and disengagement of the drive belt 12 with the conveyor rollers 14. As illustrated, the linear actuators 22a, 22b comprise pneumatically-operated diaphragms, but may comprise other actuators without departing from the invention.

The sheaves or pulleys 18 for carrying the drive belt 12 are secured to an upper portion 28 of the second part 16b of the bracket assembly by axle bolts 30, about which the sheaves 18 freely rotate. In the illustrated embodiment, the free ends of the axles 30 for the pulleys 18 are captured in a bushing (not shown) received in an oversized hole or slot (also not shown) in the side frame 24 so that the axle 30 is able to move with respect to the side frame 12 as the pulleys are moved up and down. A spring 32 is captured on the shaft of the axle 30 bolt between the pulley 18 and the side frame 12 to maintain the proper spaced relationship therebetween.

The guide rollers 20 are secured to the upper portion 28 of the second part 16b of the bracket assembly by axle bolts 34 for free rotation and in spaced relationship above their respective pulley 18, so that the drive belt 12 is captured between the pulleys 18 and their associated guide rollers 20 and the drive belt 12 is forced to move vertically when the second portion 16b of the bracket assembly is moved by the actuators 22a, 22b.

While the invention has been illustrated showing a pair of opposed pneumatic actuators, a single two-way actuator may be used, so long as it has sufficient capacity to move the sheaves in both directions for engagement and disengagement of the drive belt with the conveyor rollers.

Thus a conveyor assembly has been provided that meets the objects of the present invention. While the invention has been described in terms of a preferred embodiment, there is no intent to limit it to the same. Instead, the invention is to be defined by the scope of the following claims.

What is claimed is:

1. A conveying system comprising:
   opposed first and second curved side frames;
   a plurality of rollers supported for rotation between the side frames;
   a drive belt selectively engageable with the rollers for imparting rotation thereto; and
   a plurality of assemblies for moving the drive belt between a first position in which the drive belt engages the rollers and a second position spaced from the rollers, each assembly further comprising:
      a first bracket;
      at least one pulley having a circumferential groove for seating the drive belt, the pulley being rotatably mounted to an axle, the axle being secured to the first bracket and the first side frame;
      a guide roller secured to the first bracket so as to maintain the drive belt seated on the pulley;
   a second bracket adapted to be secured to the first side frame; and
   a first actuator mounted to the second bracket for moving the first bracket in a first direction to move the drive belt to its first position and a second actuator mounted to the second bracket for moving the first bracket in a second direction to move the drive belt to its second position.

2. A conveyor system of claim 1 wherein the axle of each assembly is pivotably secured to the first side frame.

3. The conveyor system of claim 1 wherein each assembly further comprises a spring carried by the axle for spacing the pulley from the first side frame.

4. The conveyor system of claim 1 wherein the first bracket of each assembly is configured to support the axle of the pulley such that the axle is generally in alignment with a radius of the curve of the side frames.

5. For use in a conveying system having opposed first and second curved side frames, a plurality of rollers supported for rotation between the side frames, and a drive belt selectively engageable with the rollers for imparting rotation thereto, an assembly for moving the drive belt between a first position in which the drive belt engages the rollers and a second position spaced from the rollers, the assembly comprising:
   a first bracket;
   at least one pulley having a circumferential groove for seating the drive belt, the pulley being rotatably mounted to an axle, the axle being secured to the first bracket and the first side frame;
   a guide roller secured to the first bracket so as to maintain the drive belt seated on the pulley;
   a second bracket adapted to be secured to the first side frame; and
   a first actuator mounted to the second bracket for moving the first bracket in a first direction to move the drive belt to its first position and a second actuator mounted to the second bracket for moving the first bracket in a second direction to move the drive belt to its second position.

6. An assembly of claim 5 wherein the axle is adapted to be pivotably secured to the first side frame.

7. The assembly of claim 5 further comprising a spring carried by the axle adapted to space the pulley from the first side frame.

8. The assembly of claim 5 wherein the first bracket is configured to support the axle of the pulley such that the axle is generally in alignment with a radius of the curve of the side frames.

* * * * *